United States Patent
Kiraz et al.

(10) Patent No.: US 6,272,464 B1
(45) Date of Patent: Aug. 7, 2001

(54) METHOD AND APPARATUS FOR ASSEMBLING A PREDICTION LIST OF NAME PRONUNCIATION VARIATIONS FOR USE DURING SPEECH RECOGNITION

(75) Inventors: George A Kiraz, Piscataway; Joseph Philip Olive, Watchung; Chi-Lin Shih, Berkeley Heights, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/534,150

(22) Filed: Mar. 27, 2000

(51) Int. Cl.[7] ............................. G10L 15/18; G10L 15/08

(52) U.S. Cl. ...................... 704/257; 704/255; 704/243; 704/231

(58) Field of Search ................................ 704/255, 243, 704/260, 253, 254

(56) References Cited

U.S. PATENT DOCUMENTS

| | | | |
|---|---|---|---|
| 4,829,580 | 5/1989 | Church | 381/52 |
| 5,212,730 | * 5/1993 | Wheatley et al. | 704/243 |
| 5,293,452 | * 3/1994 | Picone et al. | 704/250 |
| 5,524,169 | * 6/1996 | Cohen et al. | 704/255 |
| 5,732,395 | * 3/1998 | Alexander Silverman | 704/260 |
| 5,949,961 | * 9/1999 | Sharman | 704/258 |
| 6,078,885 | * 6/2000 | Bruetnagel | 704/258 |
| 6,092,045 | * 7/2000 | Stubley et al. | 704/254 |

OTHER PUBLICATIONS

Belhoula, K, "Rule–Based Grapheme–To–Phoneme Conversion of NAmes", EUROSPEECH, vol. II, pp. 881–884, 1993.

P.C. Bagshaw, "Phonemic Transcription By Analogy In Text–To–Speech Synthesis: Novel Word Pronunciation And Lexicon Compression", Computer Speech and Language 12(2), 1998.

K. Church, "Stress Assignment In Letter To Sound Rules For Speech Synthesis", Proc. Of. ACL, pp. 246–253, 1985.

N. Cremelie and J–P Martens, On The Use Of Prounciation Rules For Improved Word Recognition, EUROPEECH '95, Madrid, pp. 1747–1750, 1995.

(List continued on next page.)

*Primary Examiner*—Richemond Dorvil
*Assistant Examiner*—Daniel A. Nolan
(74) *Attorney, Agent, or Firm*—Kenneth M. Brown

(57) ABSTRACT

Multiple, yet plausible, pronunciations of a proper name are generated based on one or more potential language origins of the name, and based further on the context in which the name is being spoken—namely, on characteristics of the population of potential speakers. Conventional techniques may be employed to identify likely candidates for the language origin of the name, and the characteristics of the speaker population on which the generation of the pronunciations is further based may comprise, for example, the national origin of the speakers, the purpose of the speech, the geographical location of the speakers, or the general level of sophistication of the speaker population. Specifically, a method and apparatus is provided for generating a plurality of plausible pronunciations for a proper name, the method or apparatus for use in performing speech recognition of speech utterances comprising the proper name by individuals within a given population of speakers, the method or apparatus comprising steps or means respectively for (a) identifying one or more of a plurality of languages as a potential origin of the proper name; and (b) generating a plurality of plausible pronunciations for the given proper name, one or more of the plurality of pronunciations based on the one or more identified languages, and the plurality of plausible pronunciations based further on one or more characteristics associated with the given population of speakers.

34 Claims, 2 Drawing Sheets

OTHER PUBLICATIONS

M.J. Dedina and H.C. Nusbaum, "Pronounce: A Program For Pronunciation By Analogy", Computer Speech And Language, pp. 5, 55–64, 1991.

A.R. Golding and Paul S. Rosenbloom, "A Comparison Of Anapron With seven Other Names–pronunciation Systems", Journal Of The American Voice Input/Output Society, 14:1–21, 1993.

A.D. Buchsbaum, "Namsa: A Syatem For Pronouncing Proper Names", AT&T Bell Laboratories Technical Memorandum, Aug. 22, 1986.

R. Kaplan and M. Kay, "Regular Models Of Phonological Rule Syatems", Computational Linguistics, 20(3):331–78, 1994.

R. Karttunen, R. Kaplan, and A. Zaenen, "Teo–Level Morphology With Composition", COLING–92: Papers Presented to the 15$^{th}$ [sic] International Conference on Computational Linguistics, vol. 1, pp. 141–8, 8/23–28/92.

D.H. Klatt, "Review Of Text–To–Speech Conversion For English", Journal Of The Acoustical Society of America, 80(3):737–793, 1987.

L.F. Lamel and G. Adda, "On Designing Pronunciation Lexicons For Large Vocabulary, Continuous Speech Recognition", Proceedings Of ICSLP'96, Philadelphia, pp. 6–9, 1996.

M. Mohri and R. Sproat, "An Efficient Compiler For Weighted Rewrite Rules", Proceedings of the 34$^{th}$ Annual Meeting of te Association For Computational Linguistics, pp. 231–8, 1996.

M.D. Riley, "A Statistical Model For Generating Pronunciation Networks", ICCASP91, pp. 737–740, 1991.

M.G. Spiegel, "Pronouncing Surnames Automatically", Proceeding Of The Voice I/O Application Conference (AVIOS), Sept. 10, 1985.

H. Strik and C. Cucchiarini, "Modeling Pronunciation For ASR: A Survey Of The Literature", Speech Communication, 29, pp. 225–246, 1999.

T. Vitale, "An Algorithm For High Accuracy Name Pronunciation By Parametric Speech Synthesizer", Association for Computational Linguistics, vol. 17, No. 3, pp. 257–276, 1991.

C. Wooters and A. Stolcke, "Multiple–Pronunciation Lexical Modeling In A Speaker Independent Speech Understanding System" International Conference On Spoken Language Processing, vol. 3, pp. 1363–1366, 1994.

D.L. Word and R.C. Perkins, "Bulding A Spanish urname List For the 1990's—A New Approach To An Old Problem", Technical Report, Population Division, U.S. Bureau of the Census, Washington, D.C., pp. 1–25, 1996.

G.A. Kriaz, "SEMHE: A Generalized Two–Level Syatem", 34$^{th}$ Annual Meeting of the Association for Computational Linguistics, Proceeding of the Conference, Santa Cruz, California, pp. 159–166, June 24–27, 1996.

* cited by examiner

US 6,272,464 B1

METHOD AND APPARATUS FOR ASSEMBLING A PREDICTION LIST OF NAME PRONUNCIATION VARIATIONS FOR USE DURING SPEECH RECOGNITION

FIELD OF THE INVENTION

The present invention relates generally to the field of speech recognition, and more particularly to a method and apparatus for determining a meaningful set of possible pronunciations for a proper noun such as a name, for use in recognizing speech containing proper names.

BACKGROUND OF THE INVENTION

The task of speech recognition entails the automated identification of words which have been spoken by an individual, typically in order to enable an automated system to take certain (automated) actions in response thereto (i.e., to control the system by voice input). In particular, the problem of speaker-independent (as opposed to speaker-dependent) speech recognition requires that the speech of any one of a large population of possible speakers (preferably, all speakers who speak in the language or languages which are supported by the automated system) can be recognized, so that the system's resultant functions can be controlled by all possible users of the system. In certain applications of speech recognition, proper nouns, such as personal names, or the derivatives of personal names which include geographical names (such as, for example, names of countries, cities, towns and streets), trade names, and the like, occur frequently, and may in fact comprise the essence of the speech which needs to be recognized. One such application, for example, which has been widely touted and implemented in various forms, is an automated telephone name dialing capability, in which a speaker requests a telecommunications network to complete a telephone call to a given person by speaking his or her name, rather than by dialing a telephone number.

Unfortunately, the pronunciation of proper names has been one of the most challenging problems in the development of language and speech applications (such as speech recognition). Whereas most common words in a given language (i.e., "natural language" or "dictionary" words) have a fairly limited set of possible phonologically distinct pronunciations—in fact, often only one or two—proper nouns may have a substantial number of "acceptable" (phonologically distinct) pronunciations. (As is well known in the art, phonologically distinct pronunciations are fundamentally different pronunciations, as opposed to, for example, phonetically distinct pronunciations which include the normal slight variations that even a single person might produce with repeated utterances of the same word.) In addition, some of these acceptable pronunciations may be quite inconsistent with the pronunciation "rules" of the language being spoken (e.g., English), which is often the result of the name being of a "foreign" origin (i.e., a language origin different than the language being spoken). Moreover, the "acceptability" of some of these various pronunciations may depend on the particular context in which the name is being spoken, such as, for example, based on a given speaker population or in a given environment. For example, in the case of a person's name, which is of foreign (e.g., non-English) origin, such acceptable pronunciations may vary based on the speaker population, ranging from the recognition of speech from close associates of the given individual such as intimate friends, who are likely to be quite familiar with the "correct" pronunciation (as used by the bearer) of the name at one end of the spectrum, to the recognition of speech by remote associates such as, for example, American telemarketers making unsolicited phone calls to the person at the other end of the spectrum.

In other words, different people will often pronounce the same name in different ways, and a robust speech recognition system should be capable of recognizing any such "reasonable" pronunciation. Note that while some of these variations in pronunciation may be due to phenomena such as regional differences between speakers, most are the result of a combination of familiarity by the speaker with the national origin of the name, and the letter to sound rules associated with a set of relevant languages(s)—both the language of origin for the name and the language(s) which are familiar to the speaker. For example, a Chinese person will typically pronounce a Chinese person's name according to the Pinyin rules (familiar to those skilled in the art) or according to another accepted Romanization method, while an American is likely to use American English rules despite the Chinese origin of the name. As such, the Chinese name Qiru would be most likely pronounced as [ɕi-ru] by a Chinese friend, but an American, unaware of the Romanization system used, might pronounce the name as [kaɪ-ru] or [ki-ru] instead.

In addition, there are factors other than familiarity with the ethnic origin of the name which also effect pronunciation. That is, users from different ethnic backgrounds often pronounce the "same" name differently. Moreover, foreign names are frequently Anglicized differently, even by people of the same ethnic background. For example, either [ʃ'we] or [ʃ'u] may be used for the Chinese name "Hsueh." (The native pronunciation is actually [ʃü'e].) In addition, old names that are employed by various cultures often end up being pronounced differently as well. For example, the name "Epstein," which originates from 14$^{th}$-century Bavaria, became a popular Jewish and German name, resulting in the pronunciations ['epstin] and ['epstaɪn], respectively. And finally, certain mispronunciations (i.e., pronunciations for which there is no "legitimate" basis) may be so common in practice that they also need to be recognized. (See, for example, the discussion of the Chinese name "Quan" below.

In the case of names of Chinese origin, an additional complication arises due to the various Romanization systems. The name having the native pronunciation in Mandarin [ɕüen], for example, may be Romanized as either "Quan"—leading to the common mispronunciation [kwan]—or it may be Romanized as "Chuan"—leading to the pronunciation [ɕwan]. In addition, a dialectical variant of the same name from Cantonese is "Chen" having the native pronunciation [ɕʧn]. Indeed, the name may be (not unreasonably) rendered by its bearer as [ɕüen], [ɕüɑn], [ɕwɑn], [ɕʧn], [ɕʌn ], [kwan], and [kwæn], et alia.

Various approaches have been employed in the past to attempt to recognize speech containing proper names. Certain prior art name pronunciation systems for use in speech recognition, for example, employ a table lookup method based on annotated name databases. (See, e.g., U.S. Pat. No. 5,752,230, issued on May 12, 1998 to T. G. Alonso-Cedo, "Method and Apparatus for Identifying Names with a Speech Recognition Program.") However, such an approach is not capable of generating pronunciations of relatively rare names, since they are not likely to be included in the database. And unfortunately, the majority of names which are actually encountered, are, in fact, relatively rare, making such "dictionary" based solutions infeasible. (Note that the distribution of names obeys Ziph's Law, familiar to those of ordinary skill in the art. In particular, the most frequent names cover a sizable percentage of the population, but the coverage decreases rapidly. For example, the most popular American name, which is "Smith", covers 1% of the data based on the 1990 census, while the 30th most popular name, which is "King", covers 0.1% of the data. Since rare names are, in fact, very common, it is quite difficult to obtain adequate coverage with a dictionary based approach with alternative pronunciations.)

The problem of proper name pronunciation has also been addressed in the context of text-to-speech applications, where the goal is to generate, rather than to recognize, speech. In these applications, however, it is typically adequate to merely produce one single most likely (or most accurate) pronunciation of a given name. In some cases, these systems have advantageously incorporated a subprocess for determining the language origin of the name, in order to choose a pronunciation which is more likely to be an accurate one. (See, e.g., U.S. Pat. No. 4,829,580 issued on May 9, 1989 to K. W. Church, "Text Analysis System with Letter Sequence Recognition and Speech Stress Assignment Arrangement," and U.S. Pat. No. 5,040,218 issued on Aug. 13, 1991 to A. J. Vitale et al., "Name Pronunciation by Synthesizer." U.S. Pat. No. 4,829,580 to K. W. Church, which is assigned to the assignee of the present invention, is hereby incorporated by reference as if fully set forth herein.) By their nature, however, such text-to-speech systems fail to produce multiple "plausible" pronunciations of the given name, which as pointed out above, is a clear requirement for the implementation of a robust speech recognition system.

As such, the prior art approaches fail to adequately solve the speaker-independent speech recognition problem for applications in which personal names or the derivatives of personal names (such as geographical names) occur frequently. An alternative approach is required—one which can identify multiple, but nonetheless plausible, pronunciations of a given personal name, and which can furthermore adapt the set of such "acceptable" pronunciations to the particular speaker population of interest.

SUMMARY OF THE INVENTION

In accordance with the principles of the present invention, multiple, yet plausible, pronunciations of a proper name are generated based on one or more potential language origins of the name, and based further on the context in which the name is being spoken—namely, on one or more characteristics of the population of potential speakers. Conventional techniques (such as, for example, those taught in U.S. Pat. No. 4,829,580 issued to K. W. Church) may be advantageously employed to identify likely candidates for the language origin of the name, and the characteristics of the speaker population on which the set of generated pronunciations is further based may, for example, be dictated by the level of familiarity of various languages to such a population of speakers.

More specifically, the present invention provides a method and apparatus for generating a plurality of plausible pronunciations for a proper name, the method or apparatus for use in performing speech recognition of speech utterances which include the proper name by individuals within a given population of speakers, the method or apparatus comprising steps or means respectively for (a) identifying one or more of a plurality of languages as a potential origin of the proper name; and (b) generating a plurality of plausible pronunciations for the given proper name, one or more of the plurality of pronunciations based on the one or more identified languages, and the plurality of plausible pronunciations based further on one or more characteristics associated with the given population of speakers.

In accordance with various illustrative embodiments of the present invention, the characteristics of the speaker population on which the generation of the pronunciations is further based may, for example, comprise the national origin of the population of speakers (e.g., native speakers of the language of origin of the proper name who are likely to use letter-to-sound rules of their native language), the purpose of the speech (e.g., an unsolicited telemarketing phone call in the United States which is likely to employ English language letter-to-sound rules), the geographical location of the population of speakers (e.g., speakers from Texas who are reasonably likely to use either English language or Spanish language letter-to-sound rules), or the general level of sophistication of the given speaker population (e.g., highly educated speakers using a "high tech" company's internal phone system who are likely to be familiar with various letter-to-sound rules for a variety of "foreign" languages).

DETAILED DESCRIPTION

Figure 1:
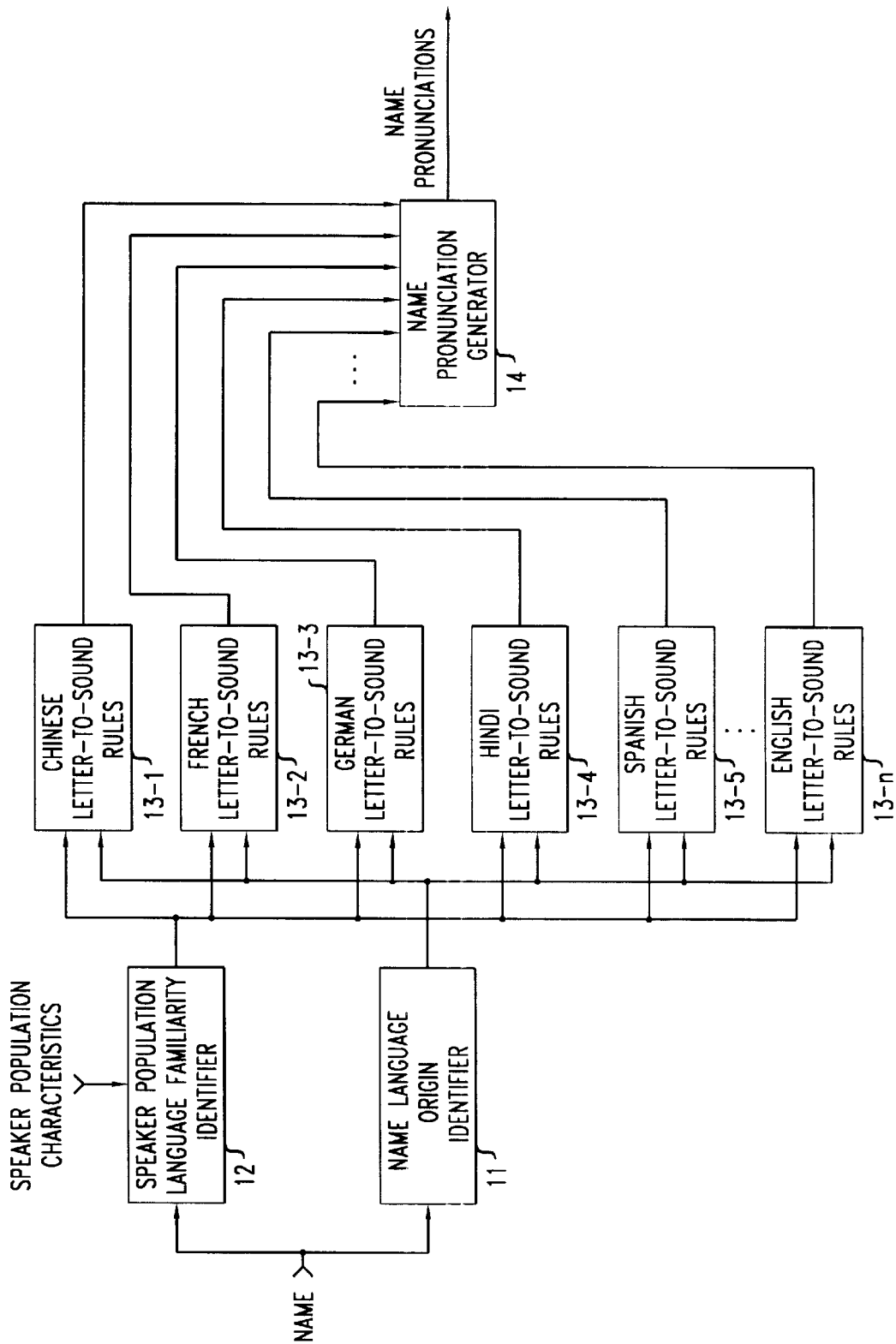
FIG. 1 shows a proper name pronunciation generation system in accordance with an illustrative embodiment of the present invention for use in an illustrative speech recognition system providing for the recognition of spoken names.
Figure 2:
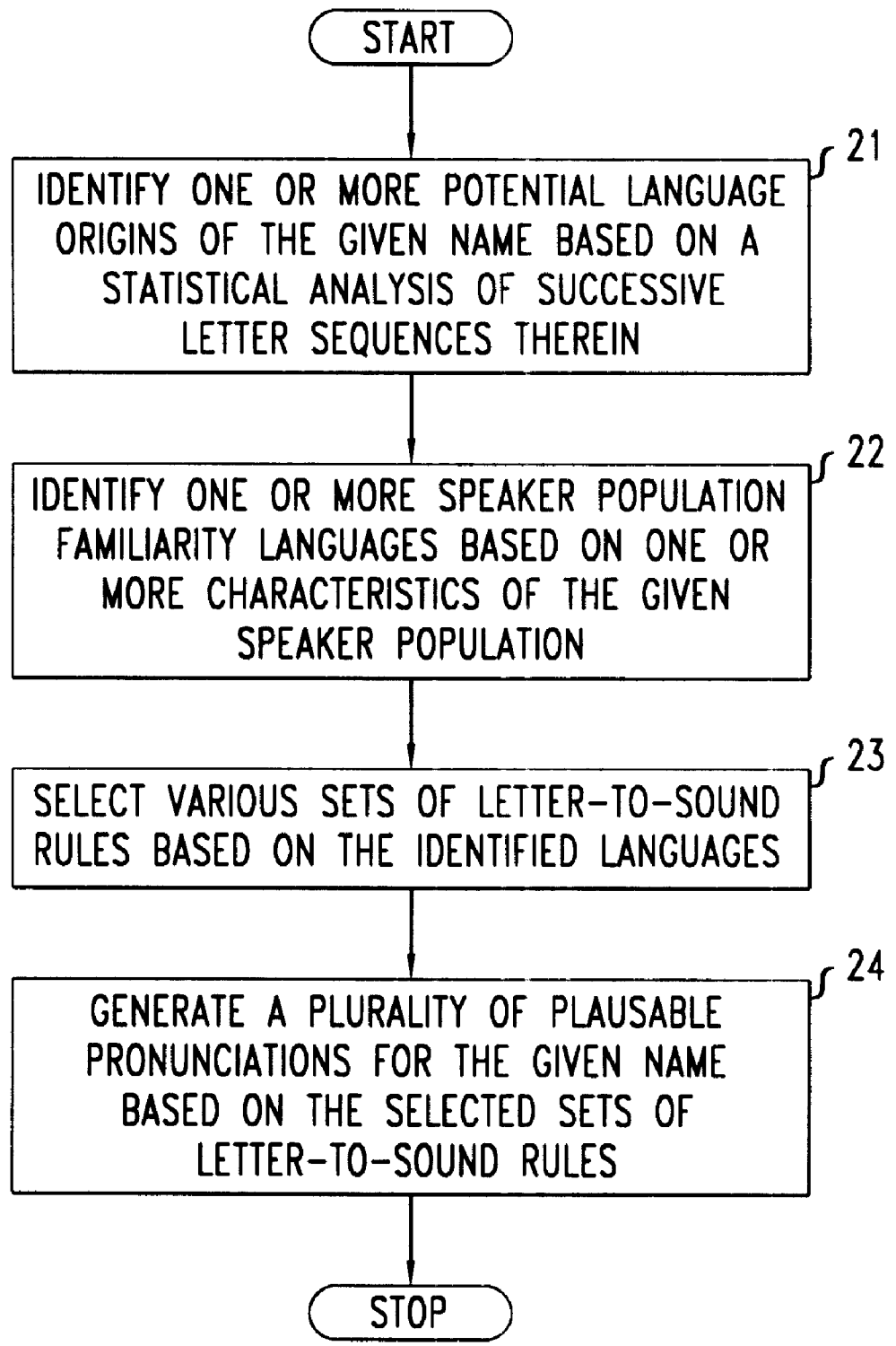
FIG. 2 shows a flow diagram describing the operation of the illustrative proper name pronunciation generation system of FIG. 1.

In accordance with an illustrative embodiment of the present invention, the system shown in FIG. 1 generates a plurality of plausible pronunciations for a proper name based on both an analysis of the potential language origins of the given name and on one or more characteristics of the given speaker population. The system of FIG. 1 illustratively operates in accordance with the flow diagram shown in FIG. 2. Specifically, the illustrative embodiment particularly described herein identifies both languages from which the given name potentially originates, and languages whose letter-to-sound rules are likely to be familiar to at least some of the individuals within the given speaker population. As a result, a reasonable set of plausible pronunciations for the given name is generated, which set of pronunciations can be advantageously employed in an illustrative speech recognition system providing for the recognition of spoken names.

More specifically, as shown in FIG. 1, a proper name is provided both to Name Language Origin Identifier 11 and to Speaker Population Language Familiarity Identifier 12. First, as can be seen in particular from flow diagram box 21 in FIG. 2, Name Language Origin Identifier 11 illustratively performs a statistical analysis of successive letter sequences which are contained in the given name, such as, for example, bigrams and trigrams, which analysis may be advantageously used to identify one or more potential language origins of the name. This statistical analysis and subsequent language identification may be advantageously performed in accordance with conventional techniques such as, for example, those taught in U.S. Pat. No. 4,829,580, referenced above and incorporated by reference herein.

More particularly, given training data for the various languages to be considered, the given proper name is advantageously split into two and three letter bigrams and trigrams, respectively. A special symbol may be used for padding at each end in order to handle the edges (the beginning and end of the name). For each language, tables of trigram and bigram probabilities may then be computed for each such bigram or trigram. If a particular trigram (for example) is not seen, its probability may be advantageously estimated using Hapex legomenon frequencies, a concept fully familiar to those of ordinary skill in the art. Then, based on these sets of probabilities, a likelihood of origin for each language may be determined by combining the computed probabilities. The selection of potential language origins may then be made based on these likelihoods. Note that it is advantageously assumed that foreign names which are not "naturally" in Latin characters are transcribed into Latin characters. In some cases (e.g., Chinese), one or more Romanization systems may be simultaneously employed to achieve such a transcription.

In addition, and in accordance with the principles of the present invention, one or more languages are illustratively identified (independently from the above-described language origin identification) by Speaker Population Language Familiarity Identifier 12, as shown in FIG. 1. This language identification is advantageously performed based on one or more predetermined characteristics of the given speaker population. In particular, as shown in flow diagram box 22 of FIG. 2, such characteristics may be illustratively used to identify one or more languages with which individuals in the given speaker population are likely to be familiar. In this manner, pronunciations based on letter-to-sound rules which are likely to be (correctly or incorrectly) employed by the relevant set of speakers will be advantageously taken into account. As pointed out above, some illustrative characteristics include, by way of example, the national origin of the population of speakers, the purpose of the speech, the geographical location of the population of speakers, and the general level of sophistication of the given speaker population.

Based on the set of languages identified by either Name Language Origin Identifier 11 or Speaker Population Language Familiarity Identifier 12, one or more sets of letter-to-sound rules for each identified language, which rules have been advantageously predetermined and then stored in various Letter-to-Sound Rules modules 13-$l$ through 13-$n$, are illustratively selected for use in the generation of pronunciations for the given name. (See flow diagram box 23 of FIG. 2.) In accordance with one illustrative embodiment of the present invention, the letter-to-sound rules may, for example, comprise hand-crafted rules which have been based on a wider set of rules obtained from tagged, annotated corpora data. (One illustrative technique for generating such annotated data is to "play" each name in a database with an existing text-to-speech system, and asking a number of human annotators to adjust the transcription, including stress information, and "replay" the name until it sounds "right." The annotators may be advantageously encouraged to provide more than one possible transcription for each name.) Finally, an alignment process, based for example on conventional dynamic programming techniques, may be advantageously used to produce letter-to-sound rules based on the annotations. (The above procedures are fully conventional and as such will be totally familiar to those of ordinary skill in the art.)

The letter-to-sound rules may illustratively comprise finite-state grammars, fully familiar to those of ordinary skill in the art, which grammars may be advantageously compiled into finite-state transducers (FSTs), which are also fully familiar to those of ordinary skill in the art. More specifically, letter-to-sound rules may be expressed in the form $$\phi \rightarrow \psi / \lambda\_\rho,$$

where $\phi$, $\psi$, $\lambda$ and $\rho$ are regular expressions with $\phi$ designating the input, $\psi$ designating the output, and $\lambda$ and $\rho$ designating optical left and right contexts, respectively. (See, e.g., "Regular Models of Phonological Rule Systems," by R. Kaplan and M. Kay, Computational Linguistics, 20(3), pp. 331–78, 1994.) Unless otherwise specified, it is conventional to apply such rules in a left-to-right fashion. As pointed out above, such rules may be advantageously compiled into FSTs using conventional techniques, such as those described in "An Efficient Compiler For Weighted Rewrite Rules," by M. Mohri et al., Proceedings of the 34th Annual Meeting of the Association for Computational Linguistics, pp. 231–8, 1996. Note that in some cases (such as, for example, for Chinese), multiple sets of letter-to-sound rules may be advantageously included for the same language in order to incorporate various Romanization systems as well as to incorporate various dialects of the given language.

Note that in the description contained herein, we do not explicitly address pronunciation variations that are independent of name pronunciation, e.g., [m"arʃə] for "Marcia" but not [m"arʃα] (without vowel reduction or [m"αʃə], [m"αʃα], with r-deletion. Such variations may be advantageously handled as part of the general pronunciation model of the given language itself. (See, e.g., "A Statistical Model for Generating Pronunciation networks," by M. D. Riley, "ICCASP 91, pp. 737–40, 1991; "On the Use of Pronunciation Rules for Improved Word Recognition," by N. Cremelie et al., EUROSPEECH 95, Madrid, 1995; "Multiple-Pronunciation Lexical Modeling in a Speaker Independent Speech Understanding System," by C. Wooters et al., International Conference on Spoken Language Processing, vol. 3, pp. 1363–66, 1994; "On Designing Pronunciation Lexicons for Large Vocabulary, Continuous Speech Recognition," by L. F. Lamel et al., Proceedings of ICSLP '96, pp. 6–9, Philadelphia, 1996; and "Modeling Pronunciation for ASR: A Survey of the Literature," by H. Strik et al., Speech Communication, 29(2–4), pp. 225–46, 1999.) Instead, the focus here is on providing pronunciation variations that are inherently distinct, aiming at capturing, for example, the two distinct pronunciations [m"ar ʃə] and [mars"iα].

The following gives, by way of example, the nature of native letter-to-sound rules for a small section of languages—Chinese, Indian and Spanish. In particular, the following describes some of the considerations which may be advantageously employed in a process of developing hand-crafted and hand-tuned rules for each of these languages. (Note that for Chinese, as pointed out above, multiple sets of native rules are advantageously employed to account for the various Romanization systems and dialects.) English-like letter-to-sound rules have been extensively discussed elsewhere, and are fully familiar to those of ordinary skill in the art. (See, e.g., "Review of Text-To-Speech Conversion for English," by D. H. Klatt, Journal of the Acoustical Society of America, 80(3), pp. 737–93, 1987.)

Chinese Letter-To-Sound Rules

As Chinese last names are confined to a finite number of syllables with fairly rigid naming conventions, it may seem that the pronunciation of names should be simple. After all, there are only a few hundred possible last names, mostly monosyllabic, with only a handful of disyllabic ones. Further, first names can be either monosyllabic or disyllabic, and in the latter case, any two random syllables from the language are valid. However, one problem arises due to the various Romanization systems. The two most commonly used systems are Pinyin and Wede-Giles (the Yale system is also occasionally used). (All of these Romanization systems are fully familiar to those of ordinary skill in the art.) To confuse matters further, many names, especially those from early immigrants, tend not to follow any standard Romanization method at all, "making up" their own. Consequently names written differently in English may have equivalent pronunciations.

By way of examples, consider the following table giving a set of Chinese last names (specified in terms of their pronunciations), together with their various Romanizations. (For example, the Chinese name "Zhang" in Pinyin is "Chang" in Wade-Giles and "Jang" in Yale, all having the native pronunciation [tʂɑŋ] in Mandarin Chinese.)

| Pronunciation | Pinyin | Wade-Giles | Yale |
|---|---|---|---|
| ljoʊ | liu | liu | lyou |
| gwan | guan | kuan | gwan |
| tʂaŋ | zhang | chang | jang |
| tsaʊ | cao | ts'ao | tsau |
| tɕjen | qian | ch'ien | chyan |
| tʂjaŋ | jiang | chaing | jyang |

To effectuate all plausible near-native pronunciations, letter-to-sound rules may be advantageously provided for each of the Romanization systems and dialects. More importantly, in order to handle non-native pronunciations, a set of English-like letter-to-sound rules may also be advantageously included. This allows for "Zhang" and "Chang" to be pronounced "non-natively" as [z"aŋ] and [tɕ"æŋ], respectively.

Most Chinese letter-to-sound rules may be effectuated as simple mappings, such as, for example, c→ts (for Pinyin), while others raise some ambiguity, such as, for example, ts→dz or ts (for Wade-Giles). Rules common to Pinyin and Wade-Giles, which are mostly diphthongs such as, for example, ai→ɑɪ, are advantageously compiled once into FSTs and then incorporated into both Romanization systems by regular operations (such as a union operation in this case).

Some vowel mappings are context-sensitive due to the fact that most Romanization systems are phonological in nature and ignore the phonetic realization. The symbol "a" in Pinyin, for example, has three surface realizations: (1) fronted and raised to [e] between a high front glide and [n]; (2) fronted to [a], a sound similar to but slightly lower than the [a] in the English name "Ann", before an [n]; or (3) a low back vowel syllable finally or in front of the velar nasal coda [ŋ]. The interaction may be captured in ordering the rules:

a→e/(j|i)___n a→a/___n a→ɑ

Advantageously, each rule may be compiled individually into an FST, and the three rules may be then composed together in the order given above. (See, e.g., "Two-Level Morphology With Composition," by L. Karttunen, et al., COLING-92: Papers Presented to the 15th International Conference on Computational Linguistics, vol. 1, pp. 141–8, 1992.)

Indian Letter-to-Sound Rules

Indian languages have a large inventory of stops, including contrasts of aspirated and unaspirated stops in both voiced and voiceless stop series. The letter "h" after stops is used to indicate aspiration. Many of these sounds have no equivalent in English and the aspiration is simply dropped when the sounds are mapped to English, such as, for example, h→{Eps} / (p|k|b|d|g)___ where {Eps} represents the empty string ε. Some indian languages, such as Hindi, distinguish dental stops and alveolar stops, which, when combined with two voicing distinctions and two aspiration distinctions, result in eight realizations. The eight-way distinction is reduced to four in the English orthography: [t], [d], [th], and [dh]. Of these [th] was transcribed [θ] (as in 'think') by both Indian and English annotators. In the other cases, if a name has a dental stop in the native language, the Indian annotators consistently transcribe the voiceless ones as English inter-dental fricative [θ] and the voiced ones as [ð]. This suggests that it is important for an Indian listener to preserve the place of articulation when these sounds are transplanted into English, at a cost of not maintaining the manner of articulation. English annotators naturally follow the English letter-to-sound rules and transcribe [t] and [d] as is.

The letter "s" may come from two sources representing either [s] or [ʃ]. Some Indian annotators tend to preserve the original lexical distinction, while others transcribe it as [ʃ] only when the following sound is a consonant, as in the names "Srinu" [ʃr'inu], "Baskar" [b'ɑʃkər] "Viswa" [v'iʃwɑ].

The mapping of vowels can be sometimes ambiguous, but contexts and rule ordering advantageously solve the disambiguation. For example, a→ʌ / ___n a→(ʌ|ɑ)

Spanish Letter-to-Sound Rules

Spanish letter-to-sounds rules are regular with a few lexical exceptions. Stress marking is also simple, with lexical exceptions marked in the orthography. The traditional stress rule states that if the final syllable ends in a vowel, "n", or "s", stress falls on the penultimate syllable; otherwise it falls on the final syllable. Exception to the stated stress rule is regularly indicted in the orthography where the stressed vowel is marked with an acute sign. This annotation is lost in the English spelling of the name, but the American pronunciation of Spanish names tends to retain the stress position, such as "Jose" being pronounced [hoʊs'eɪ].

The traditional stress rules may be advantageously implemented with the addition of two other regular stress patterns—words ending in "z" tend to have penultimate stress, parallel to the stress pattern of words with a final "s". This is not surprising since the final "z" is actually pronounced as [s] in Spanish. Note that the Spanish writing system treats the two cases differently by marking the "z" words as exceptions. Another stress rule which may be advantageously added is the final stress of words that end in "cion", in which case the final vowel "o" receives the stress.

To compensate for the loss of diacritics, which mark lexical exceptions to stress rules, a dictionary may be compiled which includes the location of stress in those words. Naturally it is no longer necessary to include words that end in "cion" and "z" if their stress pattern is consistent with the prediction of the augmented stress rules.

Segmental letter-to-sound rules include the following: The letter [u] is silent in the letter sequences "que", "qui", "gui", and "gue". Otherwise, the vowels ["a", "e", "i", "o", "u"] take the values [ɑ, e, i, oʊ, u] respectively. Some annotators prefer transcribing a word's final e as [et], and therefore, an alternative expansion may be advantageously provided for such a case.

The Spanish vowel rules are as follows:

u→EPS / (q|g)___(e|i)

a→α e→(eɬ|e) / ___ {EOS} i→i o→oʔ)

u→u where {EOS} represents the end of string.

Consonant rules unique to Spanish include the deletion of h, the mapping of intervocalic ll to [j], and the mapping of letter j to [h]. However, in the recent trend of using English names such as "Jessica", the letter j retains the [d₃] reading from English. The letter c is softened to [s] in front of front vowels, and otherwise it is mapped to [k]. The letter z is typically pronounced as [s]. In addition, there are a few voicing and nasal agreement rules. Not included in the Spanish consonant rules listed below are consonant de-germination rules and consonant combinations which are quite rare. The Spanish consonant rules are:

h→Eps;

j→h;

ll→j/___VOWEL;

ll→l;

c→s /___(i|e|ɬ|eɬ);

c→k;

q→k;

z→s;

s→z / _____ (m|n|b|d|g);

n→m / _____(p|b|m|f);

n→ŋ/ _____(k|g|h);

Generating the Set of Pronunciations

The final step in the operation of the illustrative proper name pronunciation generation system in FIG. 1 consists of the final generation of the set of plausible pronunciations for the given name by Name Pronunciation Generator module 14. In particular, as shown in flow diagram box 24 of FIG. 2, the selected sets of letter-to-sound rules (for the various identified languages) are used to generate the actual pronunciations which will be deemed to be acceptable, and which may, for example, subsequently be used in an illustrative speech recognition system providing for the recognition of spoken names. The techniques for generating the actual pronunciations based on letter-to-sound rules are, as described above, fully conventional and familiar to those of ordinary skill in the art.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the Figs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method of generating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein the step of identifying the one or more of said languages as a potential origin of the proper name comprises the steps of:

determining one or more successive letter sequences included in an orthographic representation of said proper name;

for each of said successive letter sequences, computing a plurality of first probabilities corresponding to said plurality of languages, each of said first probabilities representative of a likelihood for said successive letter sequence to occur in the corresponding language; and computing a plurality of second probabilities corresponding to each of said plurality of languages, each of said second probabilities based on a corresponding set of said first probabilities, and representative of a likelihood for said corresponding language to be an origin of said proper name.

2. The method of claim 1 further comprising the step of recognizing a speech utterance as comprising the given proper name based on one of said plurality of plausible pronunciations therefor.

3. The method of claim 1 further comprising the step of generating one or more additional plausible pronunciations for the given proper name based on a specified native language of said given population of speakers.

4. The method of claim 3 wherein the specified native language is the English language.

5. The method of claim 3 further comprising the step of recognizing a speech utterance as comprising the given proper name based on one of said additional plausible pronunciations therefor.

6. The method of claim 1 wherein said one or more successive letter sequences comprise at least two letter bigram sequences and three letter trigram sequences.

7. The method of claim 1 wherein one or more of said first probabilities corresponding to a given language are computed based on a corpus of training data from said given language.

8. The method of claim 7 further comprising the step of estimating at least one of said first probabilities corresponding to said given language whenever said corpus of training data from said given language fails to include sufficient information to compute said at least one of said first probabilities.

9. The method of claim 1 wherein said step of generating said plurality of plausible pronunciations comprises applying one or more corresponding sets of letter-to-sound rules for each of said identified languages to an orthographic representation of said proper name to generate one or more of said plausible pronunciations.

10. The method of claim 9 wherein said sets of letter-to-sound rules have been compiled into finite state machines.

11. The method of claim 9 wherein one or more of said sets of said letter-to-sound rules have been hand crafted based on an annotated corpus of training data from said corresponding identified language.

12. A method of cenerating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises familiarity by individuals within the given population of speakers with a person identified by said proper name.

13. A method of generating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises familiarity by individuals within the given population of speakers with one of said languages identified as a potential origin of said proper name.

14. A method of generating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises a predetermined purpose of the speech utterances likely to be intended by individuals within the given population of speakers.

15. A method of generating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises a geographical location from which individuals within the given population of speakers are likely to be located.

16. A method of generating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises familiarity by individuals within the given population of speakers with one or more languages other than the one or more languages identified as a potential origin of the proper name.

17. A method of generating a plurality of plausible pronunciations for a proper name, the method for use in performing speech recognition of speech utterances comprising the proper name by individuals within a given population of speakers, the method comprising the steps of:

identifying one or more of a plurality of languages as a potential origin of the proper name; and generating a plurality of plausible pronunciations for the given proper name, one or more of said plurality of pronunciations based on the one or more identified languages, and said plurality of plausible pronunciations based further on one or more characteristics associated with said given population of speakers, wherein said proper name comprises an identity of a geographical location.

18. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given proper name, one or more of said plurality of pronunciations based on the one or more identified languages, and said plurality of plausible pronunciations based further on one or more characteristics associated with said given population of speakers, wherein the means for identifying the one or more of said languages as a potential origin of the proper name comprises:

means for determining one or more successive letter sequences included in an orthographic representation of said proper name;

means, for computing, for each of said successive letter sequences, a plurality of first probabilities corresponding to said plurality of languages, each of said first probabilities representative of a likelihood for said successive letter sequence to occur in the corresponding language; and means for computing a plurality of second probabilities corresponding to each of said plurality of languages, each of said second probabilities based on a corresponding set of said first probabilities, and representative of a likelihood for said corresponding language to be an origin of said proper name.

19. The apparatus of claim 18 further comprising means for recognizing a speech utterance as comprising the given proper name based on one of said plurality of plausible pronunciations therefor.

20. The apparatus of claim 18 further comprising means for generating one or more additional plausible pronunciations for the given proper name based on a specified native language of said given population of speakers.

21. The apparatus of claim 20 wherein the specified native language is the English language.

22. The apparatus of claim 20 further comprising means for recognizing a speech utterance as comprising the given proper name based on one of said additional plausible pronunciations therefor.

23. The apparatus of claim 18 wherein said one or more successive letter sequences comprise at least two letter bigram sequences and three letter trigram sequences.

24. The apparatus of claim 18 wherein one or more of said first probabilities corresponding to a given language are computed based on a corpus of training data from said given language.

25. The apparatus of claim 24 further comprising means for estimating at least one of said first probabilities corresponding to said given language whenever said corpus of training data from said given language fails to include sufficient information to compute said at least one of said first probabilities.

26. The apparatus of claim 18 wherein said means for generating said plurality of plausible pronunciations comprises means for applying one or more corresponding sets of letter-to-sound rules for each of said identified languages to an orthographic representation of said proper name to generate one or more of said plausible pronunciations.

27. The apparatus of claim 26 wherein said sets of letter-to-sound rules have been compiled into finite state machines.

28. The apparatus of claim 26 wherein one or more of said sets of said letter-to-sound rules have been hand crafted based on an annotated corpus of training data from said corresponding identified language.

29. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises familiarity by individuals within the given population of speakers with a person identified by said proper name.

30. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises familiarity by individuals within the given population of speakers with one of said languages identified as a potential origin of said proper name.

31. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given name, one or more of said plurality of pronunciations based on the one or more identified languages, and said plurality of plausible pronunciations based further on one or more characteristics associated with said given population of speakers, wherein one of said characteristics associated with said given population of speakers comprises a predetermined purpose of the speech utterances likely to be intended by individuals within the given population of speakers.

32. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises a geographical location from which individuals within the given population of speakers are likely to be located.

33. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given proper name, one or more of said plurality of pronunciations based on the one or more identified languages, and said plurality of plausible pronunciations based further on one or more characteristics associated with said given population of speakers, wherein one of said characteristics associated with said given population of speakers comprises familiarity by individuals within the given population of speakers with one or more languages other than the one or more languages identified as a potential origin of the proper name.

34. An apparatus for generating a plurality of plausible pronunciations for a proper name, the apparatus for use in performing speech recognition of speech utterances comprising the proper name by individuals within a given population of speakers, the apparatus comprising:

means for identifying one or more of a plurality of languages as a potential origin of the proper name; and means for generating a plurality of plausible pronunciations for the given proper name, one or more of said plurality of pronunciations based on the one or more identified languages, and said plurality of plausible pronunciations based further on one or more characteristics associated with said given population of speakers, wherein said proper name comprises an identity of a geographical location.

\* \* \* \* \*